UNITED STATES PATENT OFFICE.

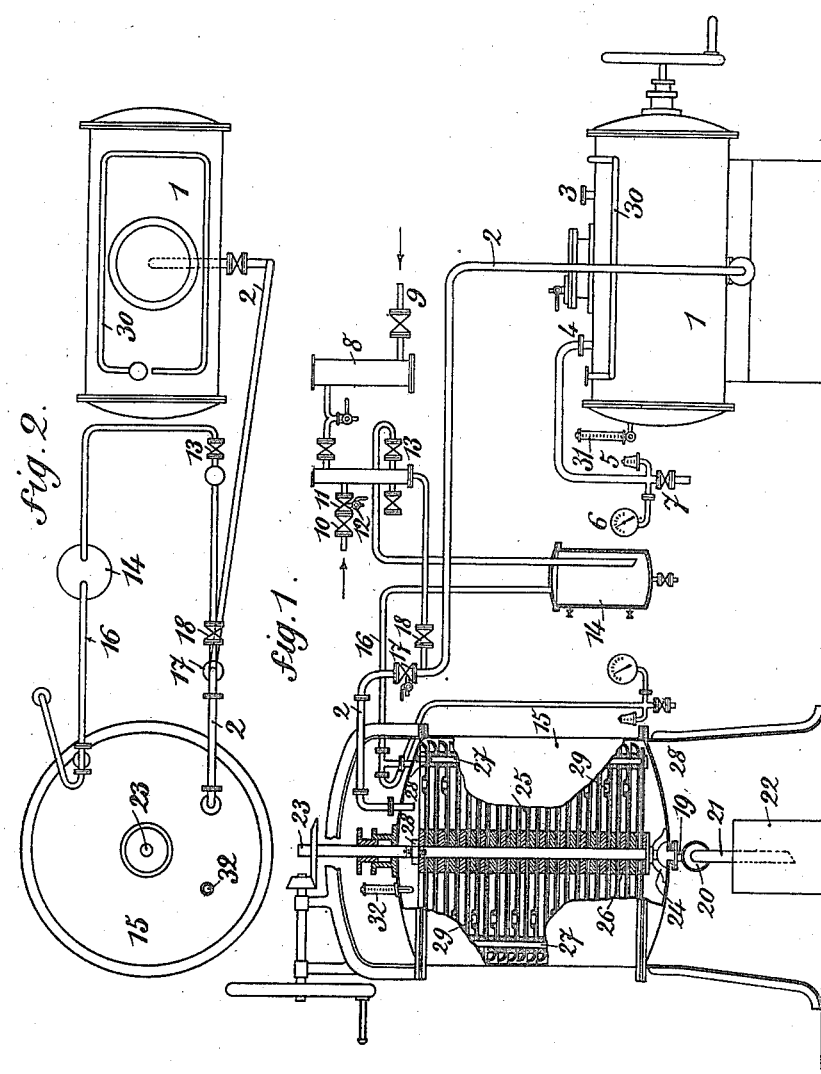

AUGUSTE BOIDIN, OF SECLIN, FRANCE, AND JEAN EFFRONT, OF BRUSSELS, BELGIUM.

PROCESS OF MANUFACTURING DIASTASES AND TOXINS BY OXIDIZING FERMENTS.

1,227,525.    Specification of Letters Patent.    Patented May 22, 1917.

Application filed July 6, 1914. Serial No. 849,151.

*To all whom it may concern:*

Be it known that we, AUGUSTE BOIDIN, a citizen of the Republic of France, residing at Seclin, Nord, France, and JEAN EFFRONT, a subject of the King of Belgium, residing at 73 Avenue Solbosch, Brussels, Belgium, have invented new and useful Improvements in Processes of Manufacturing Diastases and Toxins by Oxidizing Ferments, of which the following is a specification.

In studying the liquefaction of starchy and nitrogenous substances by means of bacteria in an alkaline medium, we have met with a series of difficulties in endeavoring to pass from laboratory to industrial working.

The bacteria which, in the small vessels used in the laboratory, gave fairly active solutions, refused to secrete diastases when transferred to culture apparatus of larger dimensions.

The study of these difficulties has led to the recognition of their causes, and at the same time to the discovery of the rules to be observed in order to bring about an abundant secretions of diastases, and a diastasic activity such as it has not been possible to attain heretofore.

The study of the influence of metals on the secretion of bacterial enzyms has shown that the multiplication of oxidizing bacteria growing in media rich in nitrogenous substances is the more hampered by the presence of certain metals the more considerable the amount of oxygen supplied to the bacteria and that, other things being equal, the production of diastase varies with the nature of the metal in the presence of which the cultures are carried on.

Thus, a series of 96-hour cultures, on a wort of soy at 10 per cent., gives the following liquefying powers:—

100 in glass
33 in tinned iron
25 in galvanized iron
25 in tinned copper
14 in iron
12 in copper
3 in presence of copper in thin sheets
100 in enameled metals
100 in aluminium.

Now, we have recognized that to obtain different diastases with the most diverse bacteria, diastases amylolytic or proteolytic, it is necessary to select nutrient media very rich in nitrogen and relatively poor in hydrocarbonaceous substances.

If, for example, comparative cultures be made, on worts containing 10 per cent. of rice, maize, potato, or barley, on the one hand, and on soy cake of 10 per cent. strength on the other hand, it is found that the wort of soy yields from 8 to 10 times the amount of diastase obtained from the media previously named.

Now, we have established the fact that the diastasic power is proportional to the amount of nitrogen in an assimilable state in the raw material, that all raw materials which only contain about one part of nitrogen to 35 to 45 parts of carbohydrates at the most yield solutions of diastase of low activity, in which the secretion of enzyms is retarded. Conversely, raw materials which contain one part of nitrogen to every 10 or 15 parts of carbohydrates yield solutions which are very rich in diastases; among these may be mentioned, soy, and especially soy cake from which the fat has been extracted; vegetable or animal albuminoid materials, caseins, the fibrin of maize, etc., may also be used.

A certain number of aerobic bacteria live very badly in the depth, even if the wort be constantly traversed by a strong current of air, and yield under these conditions acid solutions very poor in diastases. Cultivated in immediate contact with air, these same bacteria yield alkaline solutions rich in diastases when the nutrient material is sufficiently rich in nitrogen.

The method of culture and forms of apparatus described below for carrying out the process are applicable to all bacteria which possess the two properties just described.

In order to get a good diastasic power it is necessary so to arrange the conditions that the growth remains on the surface of the liquid and forms a film there. For those species which form a film with difficulty it is advantageous to inoculate concentrated wort, or such as contain solid bodies, and on the surface.

The direct contact of the bacteria with the air is necessary, for aeration of the depth of the liquid is not competent to determine the production of diastase when the growth remains submerged.

At the commencement of incubation, it is advantageous to give much air, but when the film begins to thicken the aeration must be reduced as nearly to the minimum as possible, in order that the yield of diastase acid may not fall.

The surface aeration must be so effected that the carbonic acid may be able to escape steadily, and the apparatus must be so arranged as that the aeration may be regulated to a point at which analysis shows that the escaping gas does not contain too much carbonic acid. The object of the aeration from above downward is that it may be able to be kept under control at the end of culture.

Cultures kept absolutely at rest form diastases slowly, their production is accelerated by gentle shaking or mechanical motion, which must be such that submersion is avoided. The diffusion of the active substances and the supply of fresh nutrient matter are thus facilitated.

It will be understood that the form of the apparatus employed for carrying out the process constituting this invention may be infinitely varied.

When it is a question of important installations, preference will be given to the following arrangements, which allow large quantities of liquefying diastases to be obtained without appreciable cost for labor, the filling, the emptying, and the cleaning being then mechanically effected by centrifugal force.

We proceed to describe, by way of example, the arrangement which appears the most convenient, and the most certain to secure asepsis.

In the appended drawing Figure 1 shows this arrangement in elevation, partially broken away, and Fig. 2 in plan.

In 1 there is a sterilizing autoclave, resistant to pressure, furnished with a steam pipe 2, which may also serve for the emptying, a tubulure 3 intended to receive the inoculating tap and another tubulure 4 which carries the safety valve 5, the pressure gage 6 and a clearing cock 7. The autoclave is provided with a hand agitator.

At 8 there is a cotton wool filter to sterilize the air under pressure which enters at 9; the cocks 10 and 11 serve for the introduction of steam, and 11 carries a small clearing cock 12. At 13 is a tap which serves successively for steam and for pure air; it is in communication with the air moistener 14 and the culture chamber 15 by the aeration pipe 16; 17 and 18 are two cocks necessary for the sterilization of the wort in 1.

The culture chamber 15 is composed of an aluminium reservoir, with a diameter of 1.0 to 1.50 meters, which may be sterilized under a pressure of one kilo. It is furnished at its upper part with a tubulure for the receipt of the charging pipe 2, with another tubulure connected to the air supply pipe 16, with others for the safety valve and the pressure gage. It is also provided below with an aluminium pipe 19 having a cock 20 and a tube 21 dipping into a water vessel 22.

The upper lid is provided with a stuffing box and carries a gearing which turns the vertical shaft 23, mounted in a step bearing 24. This gearing may consist, for example, of a spindle 33 turned by a handle 34 and connected to the shaft 23 by bevel pinions 35, 36.

The shaft 23 supports a series of plates 25 of a thickness of 1 or 2 mm. kept parallel by central washers 26 and by others threaded on rods 27. These washers are pressed at 28 between two strong plates of considerable thickness, in such a way as to maintain the perfect horizontality of the plates. Finally each plate has a raised border, 10 to 20 mm. high, according to the thickness of the layer of liquid which it is thought desirable to adopt and of an overflow 29.

To charge the apparatus, we proceed as follows:

Through the manhole of the cooker 1 are introduced the water and say, the soy cake. These are heated to boiling by passing in steam through 2, the orifices 3 and 4 being open and the cock 17 also slightly open to insure the sterilization of the upper part of the tube 2. At the same time steam is injected through 13, 14 and 16 in such a way as to bathe with steam the apparatus 15, the cock 20 being open at first and the vessel 22 empty.

The contents of the cooker are heated for about 30 minutes under a pressure of 1 kilo, the agitator being turned at the same time in such a way as to insure the absolute sterility of the wort and its homogeneity.

During this time, the container 15 with its plates has been sterilized, together with the cock 20 (nearly closed) by steam under pressure, and the plates are so turned as to get rid through 20 of the condensed water with which they have become loaded. The steam is then replaced by air under the precautions known by all experts who have had charge of apparatus for the pure culture of yeast, or of those known by the name of amylo apparatus.

The sterilizer is put under pure air pressure through 18, and a pressure of 1 kilo at most is put into 15 through 13. The autoclave is cooled by passing water over the upper part of the cylinder by the aid of a perforated pipe 30, and the inoculation is effected through 3 with the usual precautions against contamination. The cooling is carried to 35 to 40 degrees C. and 1 is put under an air pressure of about two kilos thus causing the wort to pass into 15 by opening the valve 7 a little.

To insure the equitable distribution of the wort on the plates, it is advisable to impart to them a slight to-and-fro motion.

The emptying of the sterilizer being effected, the room in which the apparatus is placed is kept at a temperature such that the thermometers 31 and 32 remain within the limits of the *optimum* temperatures for the development of the particular organism under treatment. At the beginning aeration is carried on pretty strongly, and this is continued until the bacteria form a continuous layer over the surface of each plate. A to and fro motion is imparted several times a day to dissociate the chains of bacteria. The air is thereafter reduced to a strict minimum, and the analysis of the gases issuing at 22 will indicate, by the oxygen content, whether enough is being furnished to the bacteria.

When the culture has acquired its maximum diastasic power, which can be determined by taking a sample at 19, after having turned the plates slightly the apparatus is emptied by centrifugal force by opening 20. The apparatus is then washed with water, this water, like the solution of diastase, leaving the plates by centrifugal force.

A variant of the process consists in cultivating the bacteria continuously, that is to say, in emptying the apparatus more or less completely after the first culture and adding cooled wort in such a way that it inoculates itself with the bacteria left upon the plates.

Thanks to the arrangements above described and the keeping of the rules laid down, there are obtained in two or three days diastase of great potency, 200 to 300 liters sufficing to liquefy 100 tons of grain.

The advantages of the apparatus described are the simplicity of construction, great surface with limited volume, simplicity of manipulation and great economy of labor.

It is evident from what precedes that the arrangement of the apparatus may be infinitely varied, that the vertical cylinder 15 may, for instance, be replaced by a horizontal one, that the mode of fixing the plates may vary according as one uses those of enamel, aluminium, porcelain, glass, etc., that instead of rotating plates, the apparatus and its envelop might be made to turn, or it might be made to oscillate to insure the emptying of the plates; moreover, one might construct the apparatus of a pile of independent plates, to make the culture on solid media such as soy cake with 1 or 2 parts of water. The cylinder 15 might also be filled with pumice-stone, coke, shavings, etc., but experience has shown that culture on these or other inert bodies and in extra thin layers only gives a feeble diastatic power.

Cultures of diastase produced by the aid of raw materials rich in albumin can easily be preserved in air by the addition of vapor antiseptics, such as 10 to 15 per cent. of sea salt, 4 to 5 per mille of the 40 per cent. formol of commerce, sulfate of magnesia or ammonia, etc.

The diastasic power of these solutions so preserved in corked barrels rises slightly with time. Finally, with the same object of preservation, the diastases or toxins may be precipitated by a salt such as sulfate of ammonia, or the solutions of diastase evaporated *in vacuo*. By evaporation *in vacuo* or in the air, an increase of the diastasic power is obtained.

Claims:

1. A process for the manufacture of diastases and toxins by oxidizing ferments which consists in using as a nutritive medium a wort containing at least one part of assimilable nitrogenous materials to fifteen parts of carbohydrates, and cultivating bacteria at the surface of the said wort in thin layers.

2. A process for the manufacture of diastases and toxins by oxidizing ferments consisting in using as a nutritive medium a wort containing at least one part of assimilable nitrogenous materials to fifteen parts of carbohydrates, and in cultivating bacteria at the surface of the said wort in layers, the thickness of which is not more than eight millimeters.

3. A process for the manufacture of diastases and toxins by oxidizing ferments consisting in cultivating bacteria at the surface of a wort containing assimilable nitrogenous materials, and subjecting said wort to a slight agitation, said agitation being sufficient to break the associations of bacteria arranged in chain-like lines.

4. A process for the manufacture of diastases and toxins by oxidizing ferments consisting in cultivating bacteria at the surface of a wort containing nitrogenous materials spread in thin layers on horizontal plates.

5. A process for the manufacture of diastases and toxins by oxidizing ferments consisting in cultivating bacteria at the surface of a wort containing nitrogenous materials in an atmosphere which is ventilated less and less as the bacteria produce less and less carbonic dioxid.

6. A process for the manufacture of diastases and toxins by oxidizing ferments consisting in cultivating bacteria at the surface of a wort of soja deprived of fat.

AUGUSTE BOIDIN.
JEAN EFFRONT.

Witnesses:
Chas. Roy Nasmith,
Alfred de Larville.